United States Patent [19]

Tripp et al.

[11] Patent Number: 5,396,654
[45] Date of Patent: Mar. 7, 1995

[54] DATA TRANSFER METHOD AND APPARATUS HAVING DUAL FREQUENCY OPERATION

[75] Inventors: Jeffrey W. Tripp, Grayslake, Ill.; Jae H. Shim, San Jose, Calif.; Bruce Paggeot, Elgin, Ill.

[73] Assignee: Motorola Inc., Schaumburg, Ill.

[21] Appl. No.: 940,551

[22] Filed: Sep. 4, 1992

[51] Int. Cl.$^6$ ............................................. H04B 1/38
[52] U.S. Cl. ...................................... 455/89; 455/88; 375/219
[58] Field of Search .................... 455/89, 73, 88; 340/825.44, 825.52; 375/7, 8; 370/84

[56] References Cited

U.S. PATENT DOCUMENTS

| | | | |
|---|---|---|---|
| 4,809,297 | 2/1989 | Polansky et al. | 455/88 |
| 4,905,282 | 2/1990 | McGlynn et al. | 375/8 X |
| 4,972,432 | 11/1990 | Wilson et al. | 455/73 |
| 5,237,570 | 8/1993 | Smolinske et al. | 455/84 |

*Primary Examiner*—Reinhard J. Eisenzopf
*Assistant Examiner*—Philip J. Sobutka
*Attorney, Agent, or Firm*—Kirk W. Dailey

[57] ABSTRACT

The present disclosure includes a discussion of a data transfer system. The data transfer system is responsible for transferring data to and from a radio transceiver (107) and all the corresponding peripheral device (111, 113) contained in within the radiotelephone (103). The data transfer system includes a data bus (109), a master controller within the transceiver (107) and a peripheral controller within each of the peripheral devices. The data transfer system has an initialization state and a operational state. During the initialization state the data bus (109) operates at a lower frequency than during the operational state. The lower speed increases the time allowed for the assignment of the unique addresses for each of the peripheral controllers. Upon detecting completion of the initialization state, the master controller conducts the change to the operational state.

17 Claims, 3 Drawing Sheets

DATA TRANSFER METHOD AND APPARATUS HAVING DUAL FREQUENCY OPERATION

FIELD OF THE INVENTION

Generally, this invention relates to high speed low amplitude data transfer systems and more specifically to operating a high speed low amplitude data bus at multiple speeds.

BACKGROUND OF THE INVENTION

Generally, data transfer systems include a data bus capable of transferring data between a master device and one or more peripheral devices. In a traditional data transfer system, the master device addresses each of the peripheral devices with an address preceding any data which it desires to send to the peripheral devices. The addresses of the peripheral devices are usually predetermined prior to operation of the data bus and are known to the master.

In newer automated systems, the address of the peripheral devices are unknown prior to operation of the data transfer system. Upon start up of the data transfer system, there is an initialization period in which each of the peripheral devices communicate to the master controller the address and other device-type information. These newer devices are far more complex and sophisticated than the traditional data transfer systems, however, they allow for the ease of operation from an users point of view. This initialization period is very complicated and requires a high degree of accuracy. If the data transfer system is initialized incorrectly, then, the subsequent communications may be lost.

It is well known in the data communications sector that there is a push for a high speed data transfer system which is capable of transferring more data with greater efficiency. Additionally, there is concern that the data transfer system generate minimal radio frequency interference (RFI) and electromagnetic interference (EMI) radiation. One way to reduce the amount of RFI and EMI radiation is to reduce the amplitude of the signal level on the data bus from the traditional 5 volts peak-to-peak signal level to 0.5 volt peak-to-peak. This reduction in the amplitude significantly reduces the amount of radiation generated by the data transfer system. Secondly, in order to create a low amplitude data system the signals generated by each of the devices connected to the data bus are heavily filtered in order to remove the harsh peak of the signal. This filtering elongates the rise and fall times of the transitions on the data bus causing variances in the signal transmitted between the master peripheral devices. Third, the high speed low amplitude data bus in which the master peripheral devices are separated by distance greater than a meter the capacitance of the physical cables of the data bus cause variable and long delay times in the transition of data between the master peripheral devices.

In order to preserve the required integrity of a automated complex data transfer system which includes a high speed low amplitude data bus and a separation of peripheral and master controllers by distances up to 20 meters, a highly accurate initialization in bus arbitration method and apparatus need to be developed such that the integrity of the data transfer system is not interfered with by noise or variances in communications during the initialization period.

SUMMARY OF THE INVENTION

DETAILED DESCRIPTION OF THE PREFERRED EMBODIMENT

The preferred embodiment encompasses a radiotelephone system. Most importantly, the radiotelephone is one which employs the high speed low amplitude data bus between the radiotelephone transceiver and multiple peripherals. The peripherals of the radiotelephone system include but are not limited to a handset and a fax machine. Other peripherals may be a data modem, a lap top computer, or a data display device. The high speed low amplitude data bus has a master controller in the transceiver and corresponding peripheral controllers in each of the peripheral devices. The data transfer system starts up in an initialization state during an initialization period. During the initialization state, first the data bus operates at a slower than normal speed to allow for oversampling and accuracy during the arbitration of the peripheral devices. Second, each peripheral is synchronized to the master device and third, each peripheral device is assigned an unique address so that the master controller may communicate to each of the peripheral devices individually. The master controller has the capability of detecting the end of this initialization state. Upon detecting the end of the initialization state, the frequency of the data bus is increased to its operational rate which is higher than that of its initialization rate. Utilizing a lower frequency during the initialization period ensures the integrity of the communications between the master and peripheral during subsequent communications. The integrity is achieved by allowing for oversampling and subsequent noise processing and to allow for the variance of the bit edges due to filtering and the capacitance and variance in length of the physical cables connected to each of the peripheral devices.

Figure 1:
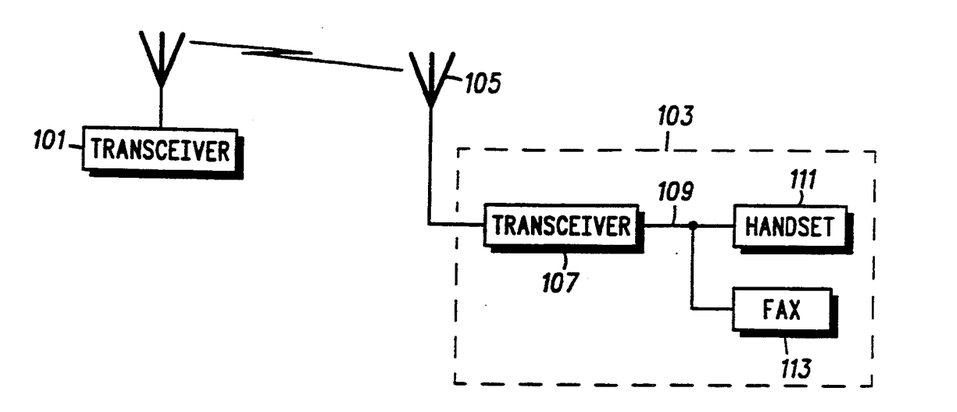
FIG. 1 is an illustration of a radiotelephone system in accordance with the present invention.

FIG. 1 is an illustration of a radiotelephone system in accordance with the present invention. The radiotelephone system includes a fixed transceiver 101 and a mobile or portable radiotelephone 103. The mobile or portable radiotelephone 103 includes a transceiver 107 an antenna 105 and multiple peripheral devices. For the purpose of illustration and description of the preferred embodiment, a handset 111, and a fax machine 113 have been included as peripheral devices. However, other peripheral devices may be substituted or may supplement these peripheral devices. The data bus 109 is a high speed low amplitude data bus which may benefit from the present invention. The mobile or portable radiotelephone 103 sends and receives radio frequency (RF) signals from the fixed site transceiver 101. The RF signals are coupled by antenna 105 and modulated and transformed into data signals by the transceiver 107. The transceiver 107 can send or receive the data signals to numerous peripheral devices including, but not limited to the handset 111 and the fax machine 113.

Figure 2:
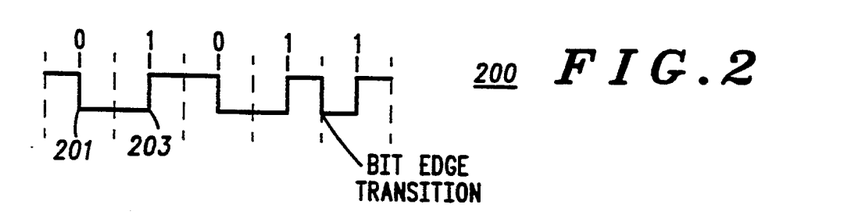
FIG. 2 is a graph representing Manchester encoded data.

The data transmitted on the data bus 109 between the transceiver and the peripheral devices is a Manchester encoded serial data stream. FIG. 2 illustrates the Manchester encoding scheme. In Manchester encoded data a logic zero is represented by falling edge at the mid-bit as illustrated at 201. A Manchester encoded data is represented by a rising edge at the mid-bit as represented at 203.

During the initialization state communications between the peripheral devices and the master device are set up. The requirements of the initialization state include synchronizing the peripheral devices to the master device and assigning each of the peripheral devices with an unique address. In order to accommodate the assigning of the unique addresses with the required accuracy, the data transfer system operates at a lower frequency than during the operational state. In the preferred embodiment, the initialization frequency is 128 KHz and the operational state frequency is 512 KHz.

Synchronization of the peripheral devices with the master device is a function that is performed at regular intervals during the operation of the data transfer system. Synchronization is obtained by sending a synchronization bit from the master device 107 to the peripheral devices 109, 113. In order to maintain synchronization during both the operational state and the initialization state, the synchronization bits need to be substantially similar, otherwise, the peripheral controllers would need to recognize more than 1 synchronization bit or the communication link would be lost.

Figure 7:
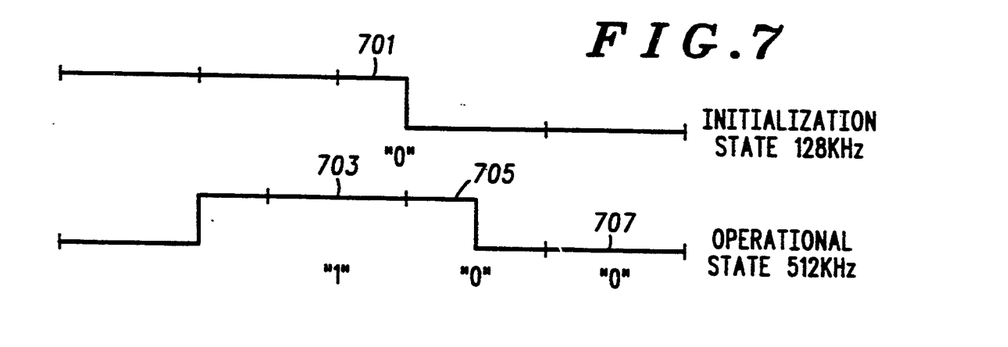
FIG. 7 includes graphs illustrating synchronization bits during an initialization and operation state in accordance with the present invention.

FIG. 7 includes an illustration of the synchronization bits sent during the initialization and the operational states. Waveform 701 is a Manchester encoded "0" transmitted at the initialization frequency (128 KHz). A Manchester encoded "1" transmitted also operates as a synchronization bit during the initialization period. Thus, every bit transmitted during the initialization state will synchronize the docks of the peripheral devices with the master. During the operational state, synchronization is performed less frequently. In the preferred embodiment, synchronization occurs once at the beginning of every timeslot, approximately once every 125 microseconds. Specifically, during the operational state the master controller sends an unencoded logic "1" bit 703, followed by a Manchester encoded logic "0" bit 705 and an unencoded logic "0" bit 707. The inverse signal also serves as a synchronization bit, namely an unencoded logic "0" bit, followed by a Manchester encoded logic "1" bit and an unencoded logic "1" bit. The synchronization bits sent during the operational and initialization states are recognized as the same by the peripheral controllers, thus, maintaining synchronization during the initialization state and the operational state.

Figure 5:
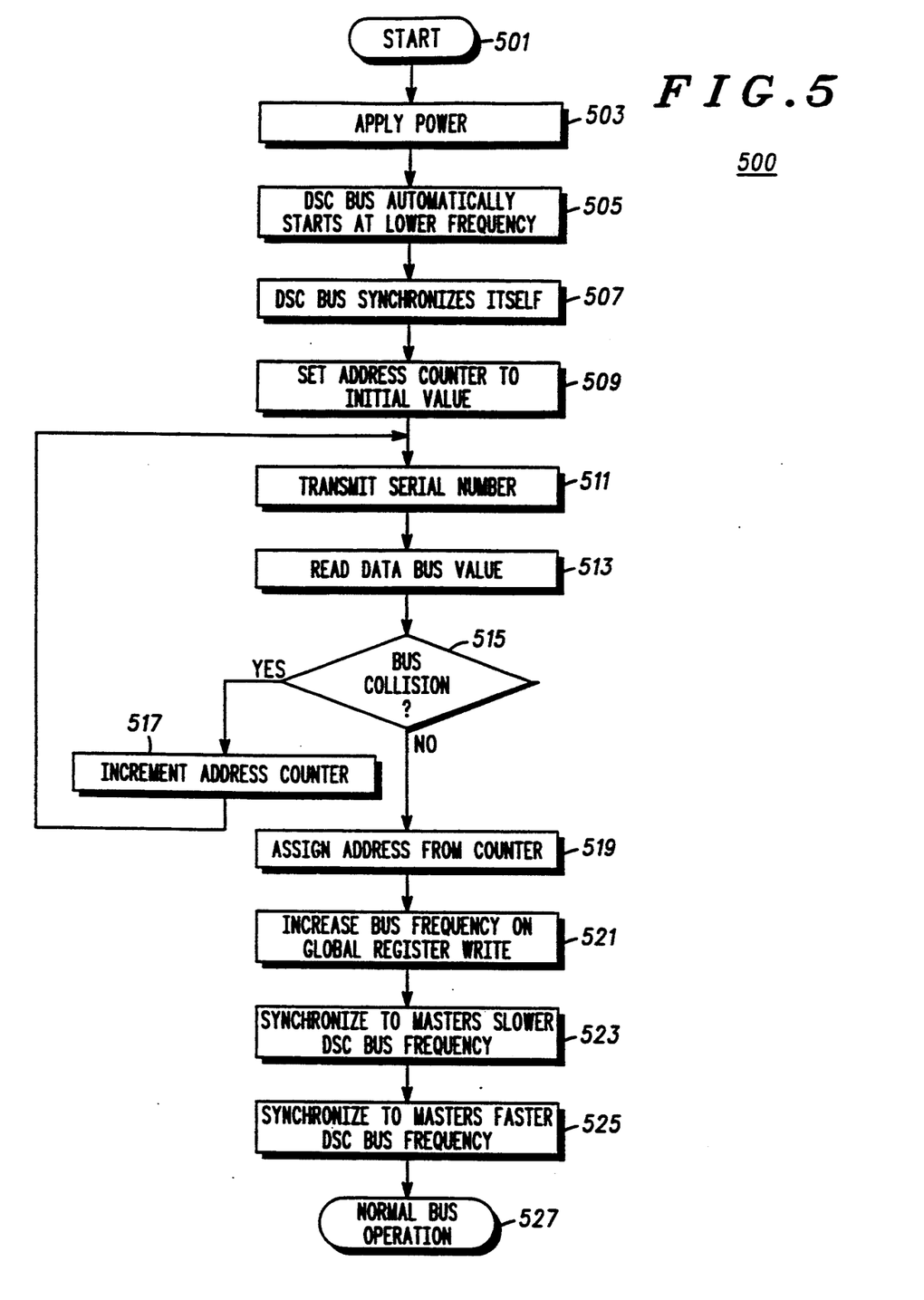
FIG. 5 is a process flow chart illustrating the steps taking in a peripheral controller during the initialization period.

Proper assignment of the unique addresses for each of the peripheral devices is required to ensure all subsequent communications are successful. Process flowchart 500 of FIG. 5 illustrates the process of each peripheral controller. At function block 509, the peripheral controller sets its address counter to the lowest address value. At function block 511, the peripheral controller transmits its serial number onto the data bus 109. At function block 513, the peripheral controller reads the current value of the data bus 109. At decision block 515, the peripheral controller compares the value of the data bus to the transmitted serial number. If the comparison determines that the serial number and the value of the data bus are equal, then there is no data bus contention. If there is no data bus contention, then the unique address of the peripheral controller is assigned the address value at function block 519.

Figure 6:
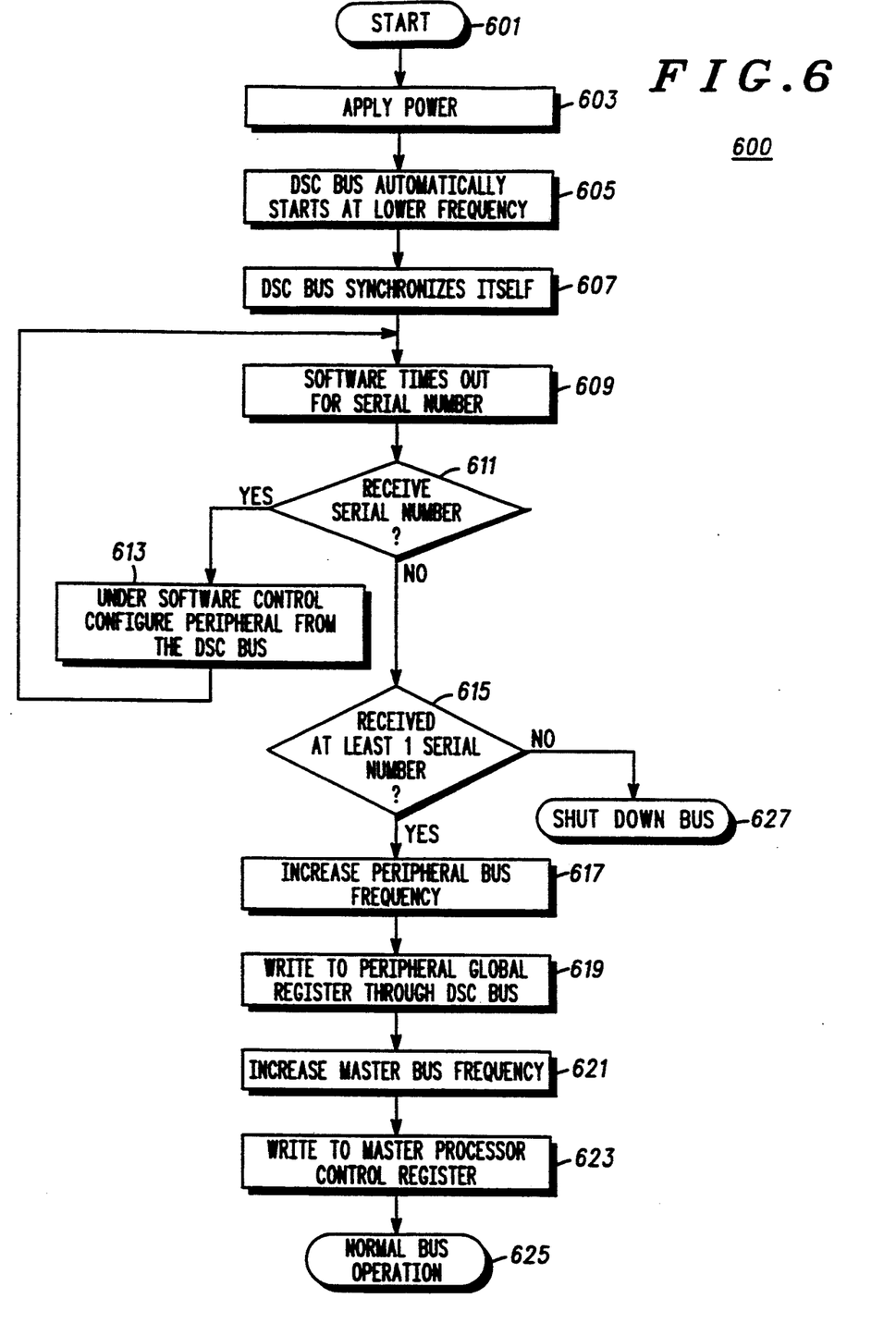
FIG. 6 is a process flow chart illustrating the steps taken in the master controller during an initialization period.

Detection of the end of the initialization period is critical to transform the data transfer apparatus into the operational state. Process flowchart 600 of FIG. 6 illustrates the master controller's process of detecting the end of the initialization period. At function block 609 the control software times out at a predetermined interval to check if a peripheral controller serial number has been received. Waiting a predetermined amount of time is equivalent to having the control software time out at a predetermined interval.

At decision block 611 the process decides if a serial number has been received. If a serial number has been received, then at function block 613, the master controller software configures the newly assigned peripheral. Upon completion of function block 613, the process waits for the next software time out at function block 609.

If decision block 611 determines a serial number was not received, then decision block 615 determines if at least one serial number has been received since the controller was powered-up. If no serial numbers have been received, then the data transfer apparatus is shut down at function block 627. If at least one serial number was received, then the end of the initialization state has been detected. Upon detection of the end of the initialization period, the frequency of data bus is changed to the operational state frequency at function block 617. In the preferred embodiment, the operational state frequency is higher than the initialization state frequency, namely, 512 KHz.

The system maintains synchronization between master and peripheral controllers while changing frequencies of the data bus 109. In the preferred embodiment the operational frequency is 512 KHz. The master controller does not change to the operational frequency until it has detected an end to the initialization period. First, the master controller broadcasts a command to all of the peripheral controllers to change to the operational frequency, while the master controller remains at the initialization frequency. During this transitional period, all of the transmissions from the master controller to the peripheral controllers look like synchronization pulses to the peripheral controllers which are running at the operational frequency. This is because of the similarities previously discussed concerning FIG. 7. Once the peripheral controllers changed to the operational frequency, the master controller begins operating at the operational frequency. Once in the operational state, communications within the data transmission apparatus become standard.

Figure 3:
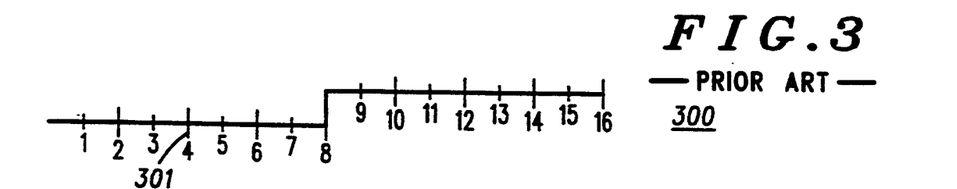
FIG. 3 is a graph illustrating the sample time available during the initialization period prior art data transfer system.
Figure 4:
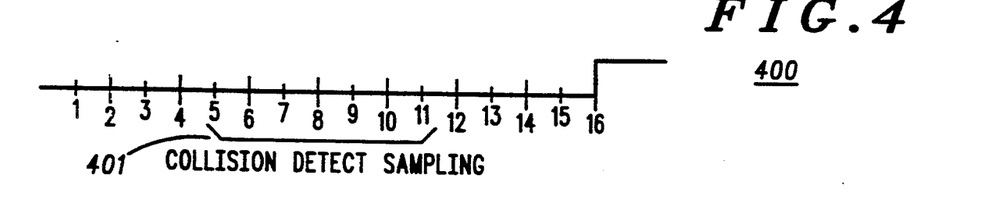
FIG. 4 is a graph illustrating a sampling time available in a data transfer system in accordance with the present invention.

The slower speed during the initialization period is necessary to ensure the integrity of subsequent communications. The waveform 300 of FIG. 3 is a prior art illustration of the sample time available to the peripheral controllers to determine their unique addresses while running at the operational speed. During the sample time 301, the peripheral controller needed to transmit its serial number on the data bus, and read the data bus value. Due to the capacitance delays, the variance in the length of cables connected to the peripherals and the variance in the bit edges of the low amplitude signals the sample time 301 was inadequate to perform oversampling and noise processing on the results of the data bus read 513. Operating at a slower speed during the initialization period increases the sample time available for reading the value of the data bus 513. The increased sample time 401 is illustrated in FIG. 4. A detailed analysis of the variable delays is contained in attached tables 1–4.

BIC 1.5
DSC BUS DELAY ANALYSIS
WITH ¼ BIT ADVANCE SCHEME
(actual range: 4/16–5/16)

| Load | Cable + coil cord | Measured Best case in temperature (−40 C.) | Measured Worst case in temperature (+85 C.) | Typical case (+25 C.) Analog path delay | | Calculated Max delay on Analog path | |
| --- | --- | --- | --- | --- | --- | --- | --- |
| Drivers and filters with no cables | 2 m | pass | pass | Down-link: Up-link: | 146 +/− 5% ns 131 +/− 5% ns | Down-link: Up-link: | 230 + ns 290 + ns |
| Drivers and filters with a 6 m cable kit | 8 m | pass | pass | Down-link: Up-link: | 171 +/− 5% ns 208 +/− 5% ns | Down-link: Up-link: | 230 + ns 290 + ns |
| Drivers and filters with a 6 m cable kit and a 2 m extender | 10 m | pass | pass | Down-link: Up-link: | 178 +/− 5% ns 229 +/− 5% ns | Down-link: Up-link: | 230 + ns 290 + ns |
| Drivers and filters with a 6 m cable kit and a 4 m extender | 12 m | pass | pass | Down-link: Up-link: | 208 +/− 5% ns 265 +/− 5% ns | Down-link: Up-link: | 230 + ns 290 + ns |
| Drivers and filters with a 6 m cable kit, a 4 m and a 2 m extenders | 14 m | fail | fail | Down-link: Up-link: | 215 +/− 5% ns 276 +/− 5% ns | Down-link: Up-link: | 230 + ns 290 + ns |

Notes:
1) Source of frequency: crystal (13 Mhz & 8.19 +/− 1% Mhz)
2) All these measurements taken above are based on BIC 1.5 with the PAL and shift register.
3) Break-down on analog path delay in typical case:
Comparator: 16 ns
driver + filter: 110 ns
6 m cable kit: 77 ns
4 m cable extender: 57 ns
2 m cable extender: 21 ns
Gate delay in BIC: 5 ns BIC 1.5
DSC BUS DELAY ANALYSIS
WITH ¼ BIT ADVANCE SCHEME
(actual range: 3/16–4/16)

| Load | Cable + coil cord | Measured Best case in temperature (−40 C.) | Measured Worst case in temperature (+85 C.) | Typical case (+25 C.) Analog path delay | | Calculated Max delay on Analog path | |
| --- | --- | --- | --- | --- | --- | --- | --- |
| Drivers and filters with no cables | 2 m | pass | pass | Down-link: Up-link: | 146 +/− 5% ns 131 +/− 5% ns | Down-link: Up-link: | 230 − ns 290 − ns |
| Drivers and filters with a 6 m cable kit | 8 m | pass | pass | Down-link: Up-link: | 171 +/− 5% ns 208 +/− 5% ns | Down-link: Up-link: | 230 − ns 290 − ns |
| Drivers and filters with a 6 m cable kit and a 2 m extender | 10 m | pass | pass | Down-link: Up-link: | 178 +/− 5% ns 229 +/− 5% ns | Down-link: Up-link: | 230 − ns 290 − ns |
| Drivers and filters with a 6 m cable kit and a 4 m extender | 12 m | pass | pass | Down-link: Up-link: | 208 +/− 5% ns 265 +/− 5% ns | Down-link: Up-link: | 230 − ns 290 − ns |
| Drivers and filters with a 6 m cable kit, a 4 m and a 2 m extenders | 14 m | fail | fail | Down-link: Up-link: | 215 +/− 5% ns 276 +/− 5% ns | Down-link: Up-link: | 230 − ns 290 − ns |

Note:
1) Source of frequency: Function Generator (13 Mhz & 8.19 - 2%)

BIC 2.0
DSC BUS DELAY ANALYSIS
WITH ¼ BIT ADVANCE SCHEME

| Load | Cable + coil cord | Best case in temperature (−40 C.) | Worst case in temperature (+85 C.) | Typical case (+25 C.) Analog path delay | | Calculated Max delay on Analog path | |
| --- | --- | --- | --- | --- | --- | --- | --- |
| Drivers and filters with no cables | 2 m | pass | pass | Down-link: Up-link: | 146 +/− 5% ns 131 +/− 5% ns | Down-link: Up-link: | 230 ns 290 ns |

-continued

BIC 2.0
DSC BUS DELAY ANALYSIS
WITH ¼ BIT ADVANCE SCHEME

| Load | Cable + coil cord | Best case in temperature (−40 C.) | Worst case in temperature (+85 C.) | Typical case (+25 C.) Analog path delay | | Calculated Max delay on Analog path | |
|---|---|---|---|---|---|---|---|
| Drivers and filters with a 6 m cable kit | 8 m | pass | pass | Down-link: | 171 +/− 5% ns | Down-link: | 230 ns |
| | | | | Up-link: | 208 +/− 5% ns | Up-link: | 290 ns |
| Drivers and filters with a 6 m cable kit and a 2 m extender | 10 m | pass | pass | Down-link: | 178 +/− 5% ns | Down-link: | 230 ns |
| | | | | Up-link: | 229 +/− 5% ns | Up-link: | 290 ns |
| Drivers and filters with a 6 m cable kit and a 4 m extender | 12 m | pass/fail | pass/fail | Down-link: | 208 +/− 5% ns | Down-link: | 230 ns |
| | | | | Up-link: | 265 +/− 5% ns | Up-link: | 290 ns |
| Drivers and filters with a 6 m cable kit, a 4 m and a 2 m extenders | 14 m | fail | fail | Down-link: | 215 +/− 5% ns | Down-link: | 230 ns |
| | | | | Up-link: | 276 +/− 5% ns | Up-link: | 290 ns |

Notes:
1) Source of frequency: crystal (13 Mhz & 8.19 +/− 1% Mhz)
2) All these measurements taken above are based on BIC 1.5 with the PAL and shift register.
3) Break-down on analog path delay in typical case:
Comparator: 16 ns
driver + filter: 110 ns
6 m cable kit: 77 ns
4 m cable extender: 57 ns

BIC 1.5/2.0
ARBITRATION ANALYSIS

| No | Description of each delay | Worst case delay | Theoretical limit |
|---|---|---|---|
| 1 | Phase difference exists between peripherals in reference to the master. | 122 ns | n/a |
| 2 | Assuming maximum cable length of 2 m apart between peripherals and one of the peripherals is a handset, this 2 m plus 2 m coil cord difference contributes the delay on down-link path. | 40 ns | n/a |
| 3 | Loop delay between peripherals on up-link path (i.e. Total delay includes the 2 m cable extender and a 2 m coil cord on a handset.) | 60 ns | n/a |
| 4 | The error of synchronization exists between peripherals due to the crystal tolerance. | 122 ns | n/a |
| 5 | Due to the rise time variation along the analog path, the detection of threshold at the comparator varies in time. The delay associated with this rise time variation also includes noise along the DSC bus. | 40 ns | n/a |
| 6 | The time of zero-crossing depends on the rise time variation and on the data transmitted. The detection of alternating one's and zero's takes longer than all one's and all zero's. | 10 ns | n/a |
| | Total | 394 ns | 427 ns |

Notes:
1) This analysis is based on three peripherals.
2) The delay associated with the various cable length are actually measured values.

What is claimed is:

1. A data transfer system for transferring data to and from a master device and at least a first peripheral device, the data transfer system including a data bus and at least a first peripheral controller and a first master controller, the data transfer system comprising:
   means for initializing the data transfer system during a first initialization period, said means for initializing comprising:
   means for operating the data bus at a first data transfer rate, and
   means for assigning the at least first peripheral device with an unique address wherein said means for assigning a unique address in the at least first peripheral further comprises executing the steps of:
   setting an address counter to a first counter value,
   transmitting a first unique serial number on the data bus,
   reading a first value of the data bus,
   comparing said first value of the data bus to said first unique serial number,
   determining if the peripheral device is contending for use of the data bus, and
   assigning the address of said address counter as the unique address of the peripheral device in absence of said contending for use of the data bus;
   means for detecting the end of said initialization period; and
   means, responsive to said means for detecting, for operating the data bus at a second data transfer rate.

2. A data transfer system in accordance with claim 1 wherein said first data transfer rate is less than said second data transfer rate.

3. A data transfer system in accordance with claim 1 wherein said first data transfer rate is 25% of said second data transfer rate.

4. A data transfer system in accordance with claim 1 wherein said means for detecting further comprises the steps of:

waiting a first predetermined amount of time;

checking if the master controller received an unique serial number during the previous step of waiting;

determining, responsive to said step of checking revealing that no unique serial number was received, that the master controller received at least one unique serial number during said means for initializing; and repeating, responsive to said step of checking revealing that an unique serial number was received, said step of waiting.

5. A data transfer system in accordance with claim 1 wherein said means for assigning further comprises executing the intermediary steps of:

incrementing said address counter in response to determining the peripheral device is contending for use of the data bus; and repeating said steps of transmitting, reading and determining until determining an absence of said contending for use of the data bus.

6. A data transfer system in accordance with claim i wherein said means for initializing further includes means for synchronizing the at least first peripheral device to the master device prior to said means for assigning.

7. The data transfer system in accordance with claim 1 wherein the data transfer system is implemented within a radiotelephone, the master device is a transceiver and the peripheral device is one chosen from a group consisting of a handset, a facsimile machine, a lap-top computer, a data display device, and a modem.

8. A method of transferring data to and from a master device and at least a first peripheral device utilizing a data bus, each master and peripheral device contains a corresponding controller, the method of transferring data comprising the steps of:

initializing during a first initialization period, said step of initializing comprising the steps of:

operating the data bus at a first data transfer rate, and assigning the at least first peripheral devices with an unique address wherein said step of assigning a unique address in the at least first peripheral further comprises the steps of:

setting an address counter to a first counter value, transmitting said a first unique serial number on the data bus, reading a first value of the data bus, comparing said first value of the data bus to said first unique serial number, determining if the peripheral device is contending for use of the data bus, and assigning the address of said address counter to the peripheral device in absence of said contending for use of the data bus;

detecting the end of said initialization period; and operating the data bus at a second data transfer rate responsive to said step of detecting.

9. A method of transferring data in accordance with claim 8 wherein said first data transfer rate is 25% of said second data transfer rate.

10. A method of transferring data in accordance with claim 8 wherein said step of detecting further comprises the steps of:

waiting a first predetermined amount of time;

checking if the master controller received an unique serial number during the previous step of waiting;

determining, responsive to said step of checking revealing that no unique serial number was received, that the master controller received at least one unique serial number during said step of initializing; and repeating, responsive to said step of checking revealing that an unique serial number was received, said step of waiting.

11. A method of transferring data in accordance with claim 8 wherein said step of assigning further comprises the intermediary steps of:

incrementing said address counter in response to determining the peripheral device is contending for use of the data bus; and repeating said steps of transmitting, reading and determining until determining an absence of said contending for use of the data bus.

12. A method of transferring data in accordance with claim 8 wherein said step of initializing further includes a step of synchronizing the at least first peripheral device to the master device prior to said step of assigning.

13. The method of transferring data in accordance with claim 8 wherein the method is implemented within a radiotelephone, the master device is a transceiver and the peripheral device is one chosen from a group consisting of a handset, a facsimile machine, a lap-top computer, a data display device, and a modem.

14. A data transfer system for transferring data to and from a master device and at least a first peripheral device, the data transfer system including a data bus and at least a first peripheral controller and a first master controller, the data transfer system comprising:

means for initializing the data transfer system during a first initialization period, said means for initializing comprising:

means for operating the data bus at a first data transfer rate, and means for assigning the at least first peripheral device with an unique address comprises executing the steps of:

setting an address counter to a first counter value, transmitting a first unique serial number on the data bus, reading a first value of the data bus, comparing said first value of the data bus to said first unique serial number, determining if the peripheral device is contending for use of the data bus, and assigning the address of said address counter to the peripheral device in absence of said contending for use of the data bus;

means for detecting the end of said initialization period; and means, responsive to said means for detecting, for operating the data bus at a second data transfer rate.

15. A data transfer system in accordance with claim 14 wherein said means for assigning further comprises executing the intermediary steps of:

incrementing said address counter in response to determining the peripheral device is contending for use of the data bus; and repeating said steps of transmitting, reading and determining until determining an absence of said contending for use of the data bus.

16. A method of transferring data to and from a master device and at least a first peripheral device utilizing a data bus, each master and peripheral device contains a corresponding controller, the method of transferring data comprising the steps of:

initializing during a first initialization period, said step of initializing comprising the steps of:

operating the data bus at a first data transfer rate, and assigning the at least first peripheral device with an unique address comprising the steps off setting an address counter to a first counter value, transmitting said a first unique serial number on the data bus, reading a first value of the data bus, comparing said first value of the data bus to said first unique serial number, determining if the peripheral device is contending for use of the data bus, and assigning the address of said address counter to the peripheral device in absence of said contending for use of the data bus;

detecting the end of said initialization period; and operating the data bus at a second data transfer rate responsive to said step of detecting.

17. A method of transferring data in accordance with claim 16 wherein said step of assigning further comprises the intermediary steps of:

incrementing said address counter in response to determining the peripheral device is contending for use of the data bus; and repeating said steps of transmitting, reading and determining until determining an absence of said contending for use of the data bus.

* * * * *

UNITED STATES PATENT AND TRADEMARK OFFICE
CERTIFICATE OF CORRECTION

PATENT NO. : 5,396,654
DATED : March 7, 1995
INVENTOR(S) : Tripp et al.

It is certified that error appears in the above-indentified patent and that said Letters Patent is hereby corrected as shown below:

Column 9, claim 6, line 1, replace "claim i" with --claim 1--.

Signed and Sealed this

Twenty-seventh Day of June, 1995

Attest:

BRUCE LEHMAN

Attesting Officer     Commissioner of Patents and Trademarks